United States Patent
Like

(10) Patent No.: US 12,300,987 B1
(45) Date of Patent: May 13, 2025

(54) ELECTRIC JUNCTION BOX ASSEMBLY WITH REMOVABLE COVER

(71) Applicant: Sumitomo Wiring Systems, Ltd., Yokkaichi (JP)

(72) Inventor: Nathan Like, Farmington Hills, MI (US)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 48 days.

(21) Appl. No.: 18/505,200

(22) Filed: Nov. 9, 2023

(51) Int. Cl.
*B60R 16/023* (2006.01)
*H02G 3/08* (2006.01)
*H02G 3/16* (2006.01)

(52) U.S. Cl.
CPC ......... *H02G 3/081* (2013.01); *B60R 16/0239* (2013.01); *H02G 3/16* (2013.01)

(58) Field of Classification Search
CPC .................................................. B60R 16/0239
See application file for complete search history.

(56) References Cited

U.S. PATENT DOCUMENTS

| 10,667,413 | B1 | 5/2020 | Carnick et al. | |
| 2008/0211607 | A1* | 9/2008 | Moreinis | H01R 13/7135 335/15 |
| 2011/0084549 | A1* | 4/2011 | Scheele | H05K 7/026 307/9.1 |
| 2014/0170868 | A1* | 6/2014 | Komiya | B60R 16/0238 439/76.2 |
| 2014/0322934 | A1 | 10/2014 | Kowtun | |
| 2015/0165992 | A1* | 6/2015 | Scheele | H01R 9/2491 307/9.1 |
| 2016/0073520 | A1* | 3/2016 | Darr | H05K 7/026 361/752 |
| 2016/0336670 | A1* | 11/2016 | Carbonell Maté | H01R 13/113 |
| 2019/0393650 | A1* | 12/2019 | Yamane | H01R 13/62938 |
| 2020/0185870 | A1* | 6/2020 | Hamada | H01R 13/04 |
| 2023/0083624 | A1* | 3/2023 | Liu | B60R 16/0239 361/752 |

FOREIGN PATENT DOCUMENTS

| CN | 216145910 U | 3/2022 |
| DE | 102010042418 A1 | 5/2011 |
| JP | 5954090 B2 | 4/2014 |
| KR | 20180047791 A | 5/2018 |

* cited by examiner

Primary Examiner — Hung V Ngo
(74) Attorney, Agent, or Firm — Honigman LLP

(57) ABSTRACT

An electric junction box to facilitate the supply of power from a battery to an electric device, including an outer case having an open bottom opposite of an open top. A pair of terminals are fixed within the outer case and spaced apart from each other. A top cover is configured to close the open top and a bottom cover is configured to close the open bottom. A fuse cover assembly is disposed within the outer case, the fuse cover assembly including a base having a top surface and a bottom surface opposite of the top surface, a tower disposed on the top surface and configured to hold a spring, and an activation tab disposed on the bottom surface. The bottom cover is configured to engage the activation tab so as to position the spring between the pair of terminals, completing the electrical connection and allowing the flow of power through the electric junction box.

14 Claims, 9 Drawing Sheets

ELECTRIC JUNCTION BOX ASSEMBLY WITH REMOVABLE COVER

TECHNICAL FIELD

The present specification generally relates to an electric junction box assembly and more particularly to an electric junction box assembly having a removable cover for disconnecting power.

BACKGROUND

In general, an electric junction box assembly is used in a platform, such as an automotive vehicle, to distribute power throughout the vehicle. The electric junction box assembly includes a housing enclosed by a top cover and a bottom cover. The housing holds electric components which are configured to distribute power from a power source, such as a battery, to electric components throughout the vehicle.

The electric junction box assembly includes power terminals and wires configured to couple one of the power terminals to the battery and the other power terminal to electric devices external to the electric junction box assembly. The electric junction box assembly is mounted in the vehicle and competes with other devices for packaging space. As such, maintenance of the electric junction box assembly may be difficult as access to the power terminals may be difficult. Further, it is desirable to make sure that the power is disconnected before maintenance is performed. To ensure that the power is disconnected, the wires may be disconnected from the power terminals. However, removing the wires may be time consuming in instances where the power terminals are not easily accessible due to packaging constraints. Further, in almost every case, the top cover or bottom cover must be removed in order to perform maintenance.

Accordingly, it remains desirable to have an electric junction box assembly configured to disconnect from power by simply removing the bottom cover.

SUMMARY

In one aspect, an electric junction box assembly is provided. The electric junction box assembly is configured to supply power from a battery to a plurality of electric devices. The electric junction box assembly includes an outer case having an open bottom opposite of an open top, and a pair of terminals is fixed within the outer case. Each terminal is spaced apart from the other. The electric junction box further includes a top cover, a bottom cover and a fuse cover assembly. The top cover is configured to close the open top and the bottom cover is configured to close the open bottom. The fuse cover assembly is disposed within the outer case. The fuse cover assembly includes a base having a top surface and a bottom surface opposite of the top surface. The fuse cover assembly further includes a tower disposed on the top surface and configured to hold a spring. The fuse cover assembly further includes an activation tab disposed on the bottom surface. The bottom cover is configured to engage the activation tab so as to position the spring between the pair of terminals so as to complete an electric connection.

In one aspect, the activation tab is hingedly connected to the fuse cover assembly.

In one aspect, the activation tab includes an arm and a contact portion and the arm is orthogonal to the tower and the contact portion.

In one aspect, the arm is integrally formed to the base and is defined by a pair of slits on opposite ends.

In one aspect, the fuse cover assembly further includes a pair of walls spaced apart from each other and a lower portion of the tower is interposed between the pair of walls.

In one aspect, the arm, the contact portion, and the tower are formed as a unitary piece.

In one aspect, the arm moves between a compressed and an uncompressed state. In such an aspect, the arm is angled downwardly relative to the base in the uncompressed state and the arm is flush with the base in the compressed state so as to position the spring between the pair of terminals.

In one aspect, a top portion of the tower is configured to hold the spring in a fixed position.

In one further aspect, the spring is formed of an electrically conductive material.

In one further aspect, the tower includes a pair of retaining fingers spaced apart from a body of the tower and configured to position the spring between the body and the retaining fingers.

In one aspect, the tower has a width configured to be received between the pair of terminals.

In one aspect, the spring is compressible between a loaded state and an unloaded state, wherein a width of the spring is wider in the unloaded state relative to the loaded state.

In one aspect, in an unloaded state, the width of the spring is greater than a width of the body of the tower.

In one aspect, the pair of terminals generates a load to move the spring to the loaded state.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring generally to the figures, embodiments of the present disclosure include an electric junction box assembly having a bottom cover removably attached to an outer case wherein the bottom cover is configured to complete an electric connection when attached to the outer case and disconnect an electric connection when removed from the outer case. Accordingly, the electric junction box disclosed herein allows power to be disconnected by simply removing the bottom cover so as to allow for maintenance to be performed.

Figure 1:
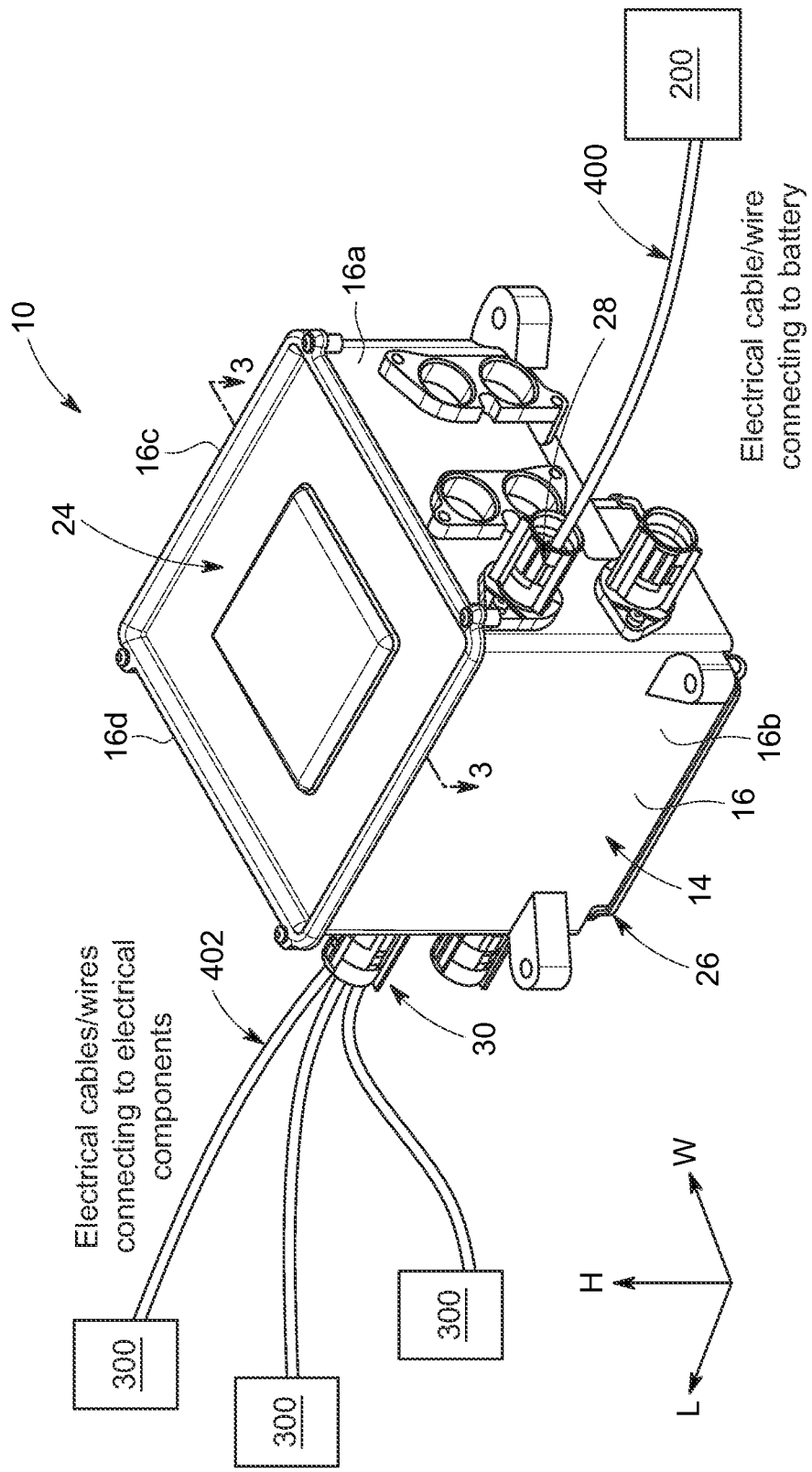
FIG. 1 is an exemplary depiction of an electric junction box assembly according to one or more embodiments illustrated herein.
Figure 2:
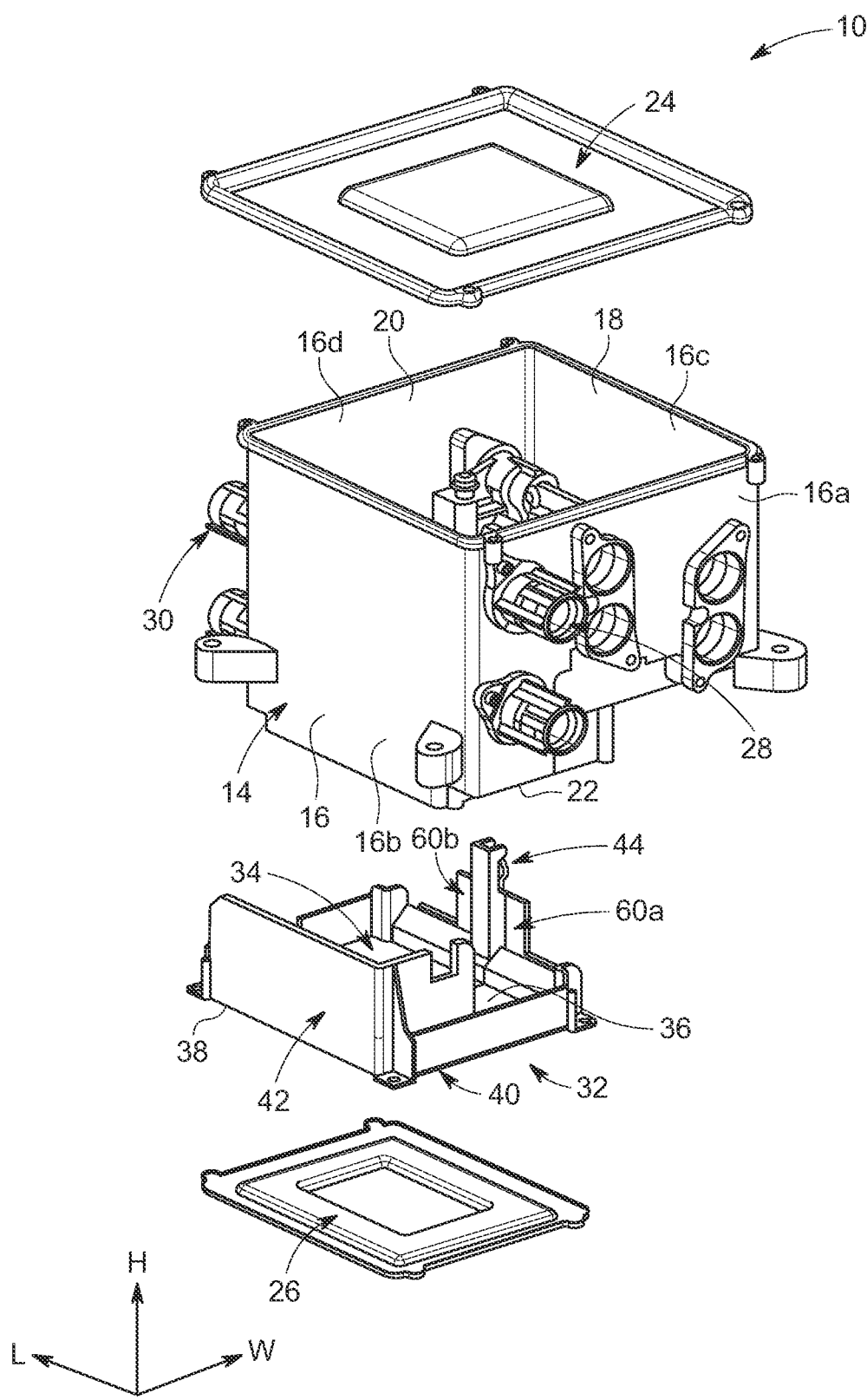
FIG. 2 is an exploded view of the electric junction box assembly shown in FIG. 1.

With reference first to FIGS. 1 and 2, a perspective view and an exploded view of an illustrative embodiment of an electric junction box assembly 10 is provided. The electric junction box assembly 10 is configured to house a plurality of electric components 12, seen in FIG. 4. Such electric components 12 illustratively include a relay switch, fuses, and the like.

The electric components 12 are configured to direct power from a power source 200 such as a battery to various electric devices 300, such as actuators, motors, and the like. For illustrative purposes, the electric junction box assembly 10 disclosed herein is described within the context of an automotive vehicle (not shown). However, it should be appreciated that the electric junction box assembly 10 disclosed herein is described in the context of an automotive vehicle for illustrative purposes, but may be used in other applications. Accordingly, a description of the electric junction box assembly 10 within the context of an automotive vehicle is not limiting to the scope of the appended claims.

With reference again to FIGS. 1 and 2, the electric junction box assembly 10 includes an outer case 14 having an outer wall 16 bounding a storage space 18 and having a generally cuboidal dimension so as to define an open top 20 opposite an open bottom 22. The outer wall 16 may be defined as having a front wall 16a, a pair of side walls 16b, 16c, and a back wall 16d. The outer wall 16 is a generally planar member which may be formed of a resilient and durable material suitable for injection molding, illustratively including polypropylene, Acrylonitrile butadiene styrene, polyoxymethylene, polycarbonate, and the like.

The outer case 14 may further include a top cover 24 and a bottom cover 26 configured to close the open top 20 and the open bottom 22 respectively. The front wall 16a and the back wall 16d may include a first power terminal 28 and a second power terminal 30, respectively, for receiving a first wire 400 and a second wire 402 respectively. The first wire 400 provides power from the power source 200 to the electric junction box assembly 10 and the second wire 402 supplies power to the electric devices 300 external to the electric junction box assembly 10. The top cover 24 and the bottom cover 26 may be attached to the outer case 14 using conventional fastening means such as a bolt, a screw or a clips.

Figure 3:
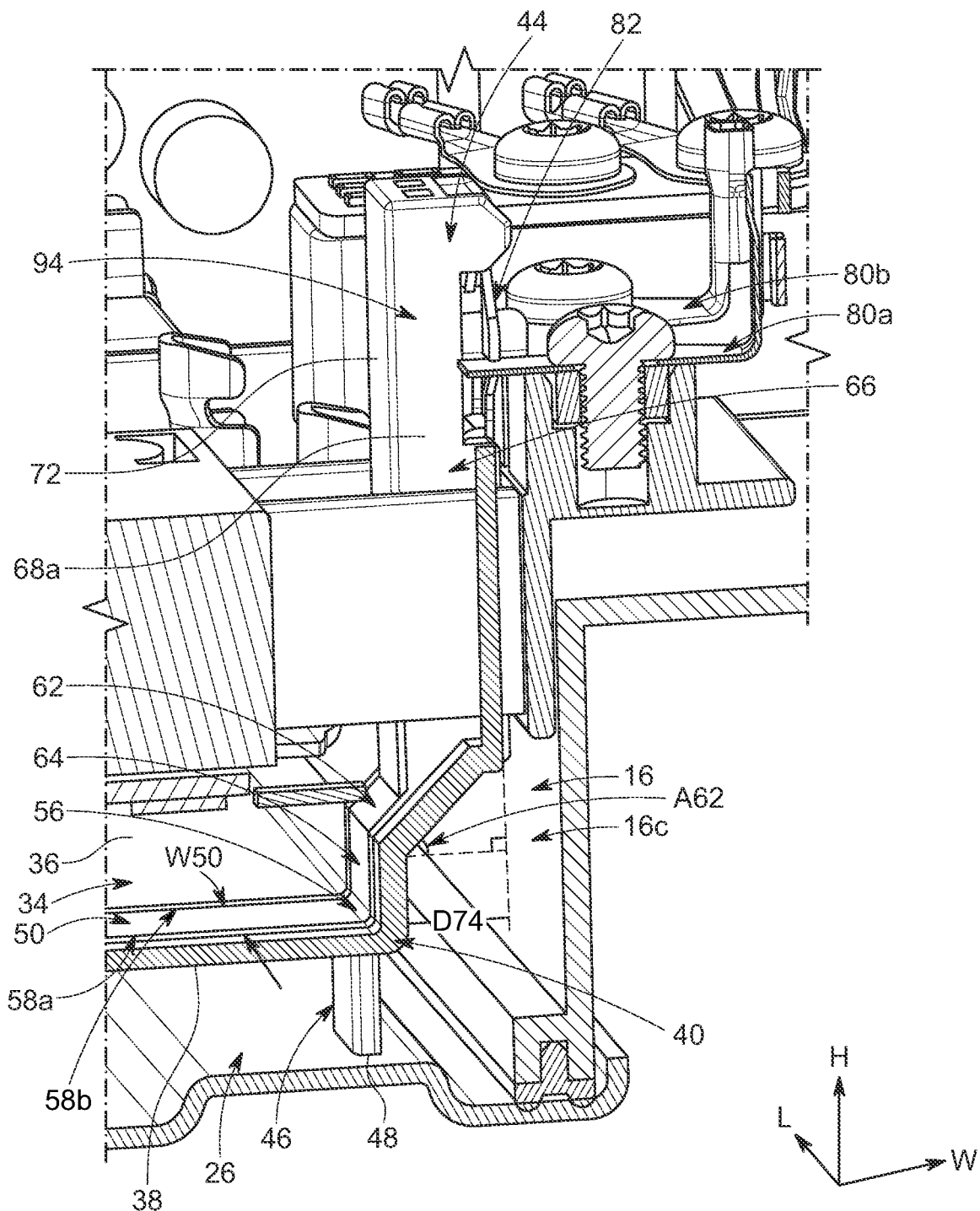
FIG. 3 is a cross-sectional perspective view, taken along line 3-3 of FIG. 1, of an electric junction box interior housing, the cross-section taken along the center of a terminal.

With reference again to FIG. 2 and now to FIG. 3, the electric junction box assembly 10 further includes a fuse cover assembly 32 disposed within the outer case 14. The fuse cover assembly 32 is configured to hold electronic components to complete an electric connection between the power source 200 and the electric devices 300. The fuse cover assembly 32 includes a base 34. The base 34 is a generally planar member having a top surface 36 exposed to the storage space 18 of the outer case 14 and a bottom surface 38 opposite of the top surface 36. The base 34 has an outer periphery 40 that is shaped to fit within the open bottom 22 in a tight-fit manner so as to accommodate the entirety of the fuse cover assembly 32 within the outer case 14 when the bottom cover 26 is installed. The fuse cover assembly 32 is a resilient member that is not electrically conductive and formed of a material suitable for injection molding, illustratively including polypropylene, Acrylonitrile butadiene styrene, polyoxymethylene, polycarbonate, and the like.

The fuse cover assembly 32 includes a base wall 42 disposed on the top surface 36 of the base 34 and extends upwardly and is generally orthogonal to the top surface 36 of the base 34. The base wall 42 is disposed around the periphery 40 of the top surface 36 to provide the fuse cover assembly 32 with structure and rigidity. The fuse cover assembly 32 further includes a tower 44 disposed on the top surface 36. The tower 44 extends upwardly from the top surface 36 and is generally orthogonal to the base 34.

The fuse cover assembly 32 further includes an activation tab 46, the activation tab 46 comprising a contact portion 48 and an arm 50. The contact portion 48 is disposed on the bottom surface 38 of the base 34 and may be directly beneath the tower 44. That is, the contact portion 48 and the tower 44 are fixed along an axis defining a height "H" of the base 34. The contact portion 48 is a structure which protrudes downwardly from the bottom surface 38 of the base 34. The contact portion 48 is shown as being a generally elongated member configured to engage with the bottom cover 26.

Figure 7:
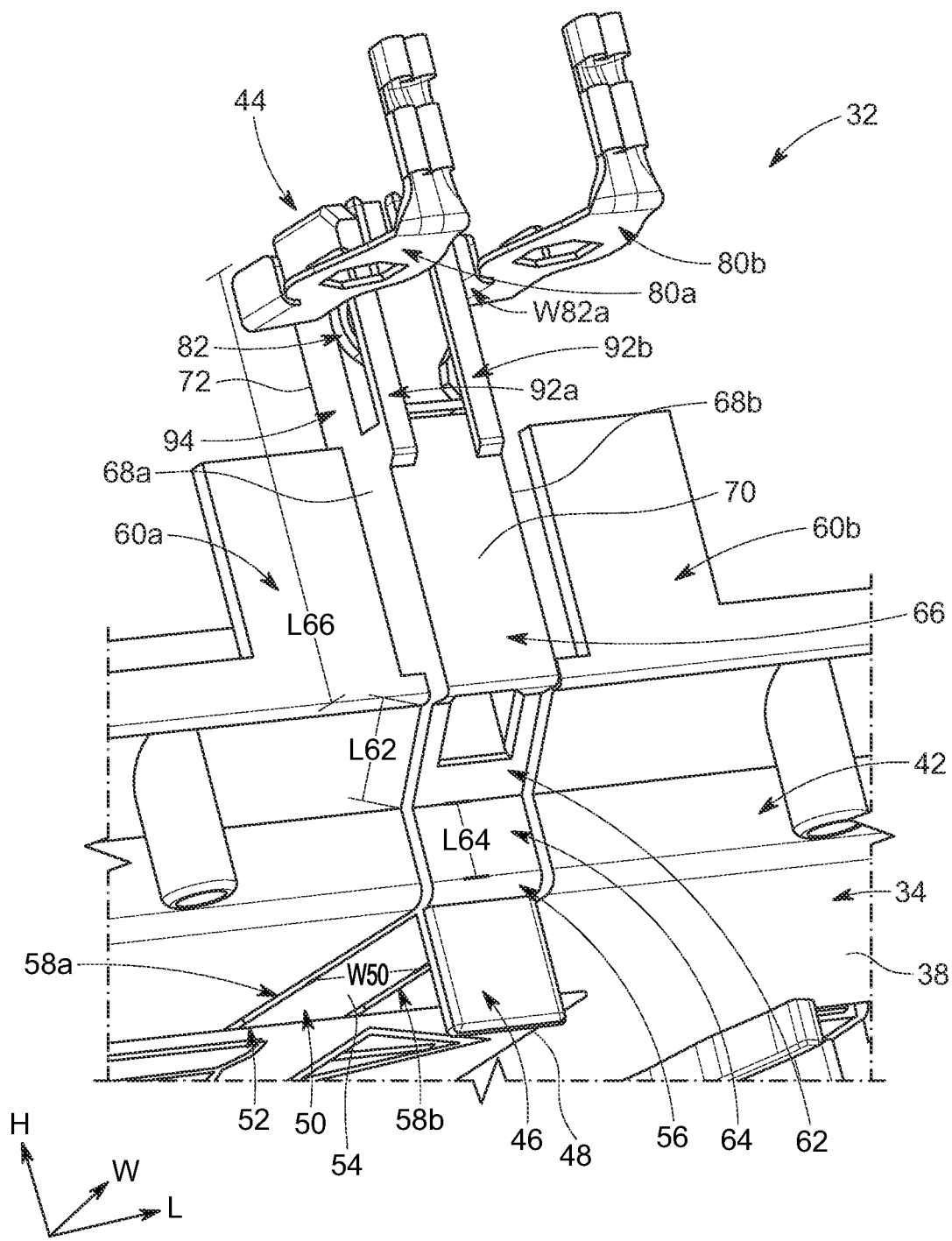
FIG. 7 is a perspective view of the activation tab of the fuse cover assembly showing the spring in a loaded state.
Figure 8:
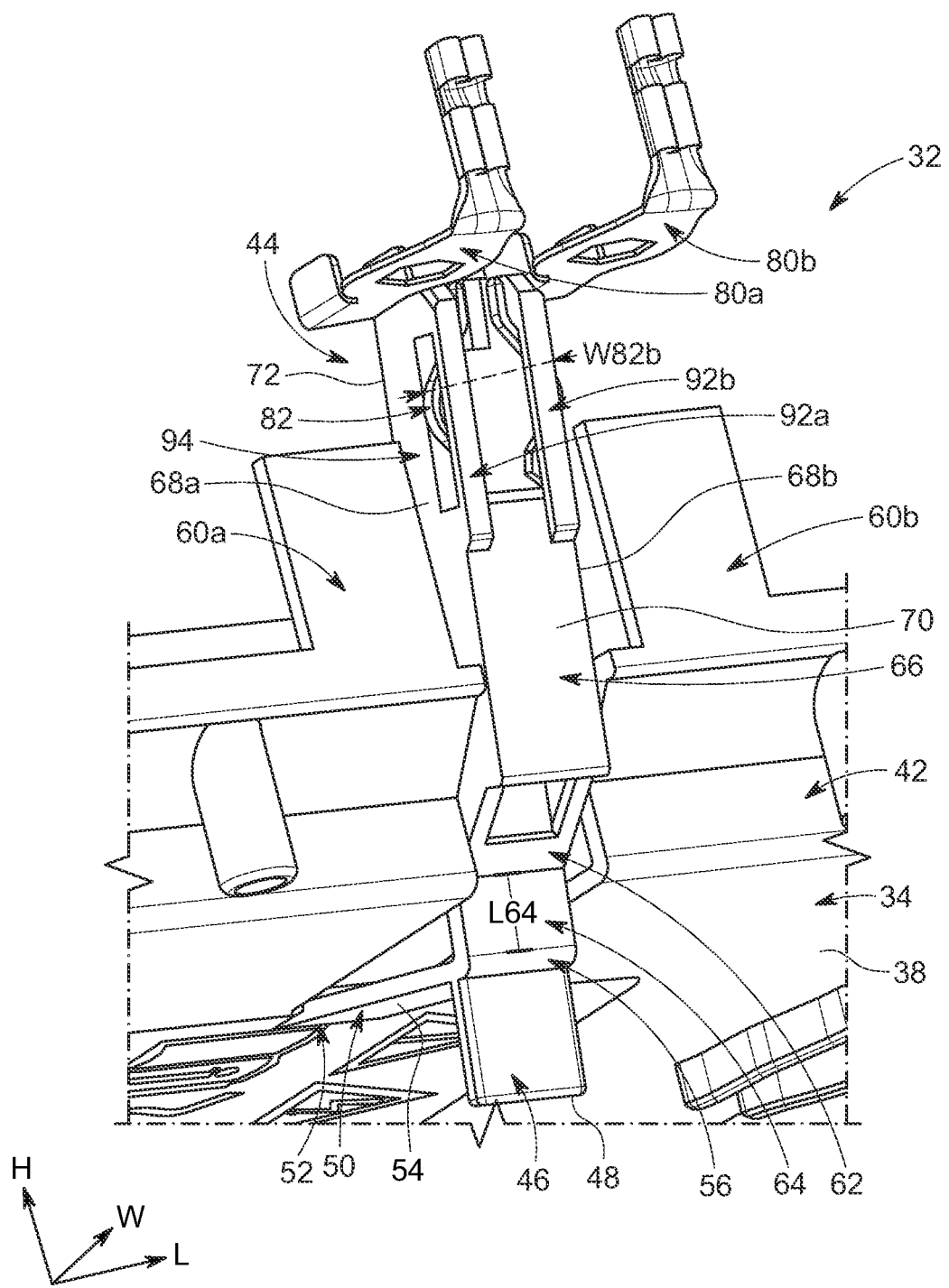
FIG. 8 is a view of FIG. 7 showing the spring in an unloaded state.

With reference now to FIGS. 7 and 8, the arm 50 of the activation tab 46 includes a living hinge 52 hingedly connecting the arm 50 to the base 34. In such an aspect, the contact portion 48 is disposed on an underside 54 of the arm 50 and is disposed on a distal end 56 of the arm 50 opposite of the living hinge 52. The base 34 includes a pair of slits 58a, 58b disposed on opposite sides of the arm 50 and the tower 44. The fuse cover assembly further includes fuse cover walls 60a, 60b disposed on a top edge of the base wall 42 and spaced apart from both sides of the tower 44. A width W50 of the arm 50 is dimensioned to fit between the two slits 58a, 58b. The tower 44 is disposed on the distal end 56 of the arm 50 and projects upwardly from the top surface 36 of the arm 50. The tower 44 is illustratively shown as having an angled portion 62 interposed between a first portion 64 and a second portion 66. The first portion 64 is a generally planar member and the second portion 66 is a generally cuboidal rectangular member having a length L66 greater than a length L64 of the first portion 64. Defining the cuboidal rectangular shape of the second portion 66 is a pair of side surfaces 68a, 68b, connected to an outer surface 70, and an inner surface 72. A tower width W44 is defined by the pair of side surfaces 68a, 68b. The first portion 64 and the second portion 66 are offset from each other by an offset distance D74, the offset distance D74 defined by a length L62 and an angle A62 of the angled portion 62.

In one aspect, the living hinge 52, the arm 50, the contact portion 48, and the tower 44 are formed as a unitary piece and may be formed collectively as a unitary piece with the base 34. The living hinge 52 is configured to move the arm 50, the tower 44, and the contact portion 48 between an uncompressed state and a compressed state. In the uncompressed state, the living hinge 52 positions the arm 50 at an angle relative to the bottom surface 38 of the base 34 so as to be beneath the bottom surface 38 of the base 34. In the compressed state, the contact portion 48 is pressed upwardly wherein the underside 54 of the arm 50 and the bottom surface 38 of the base 34 are coplanar.

Figure 4:
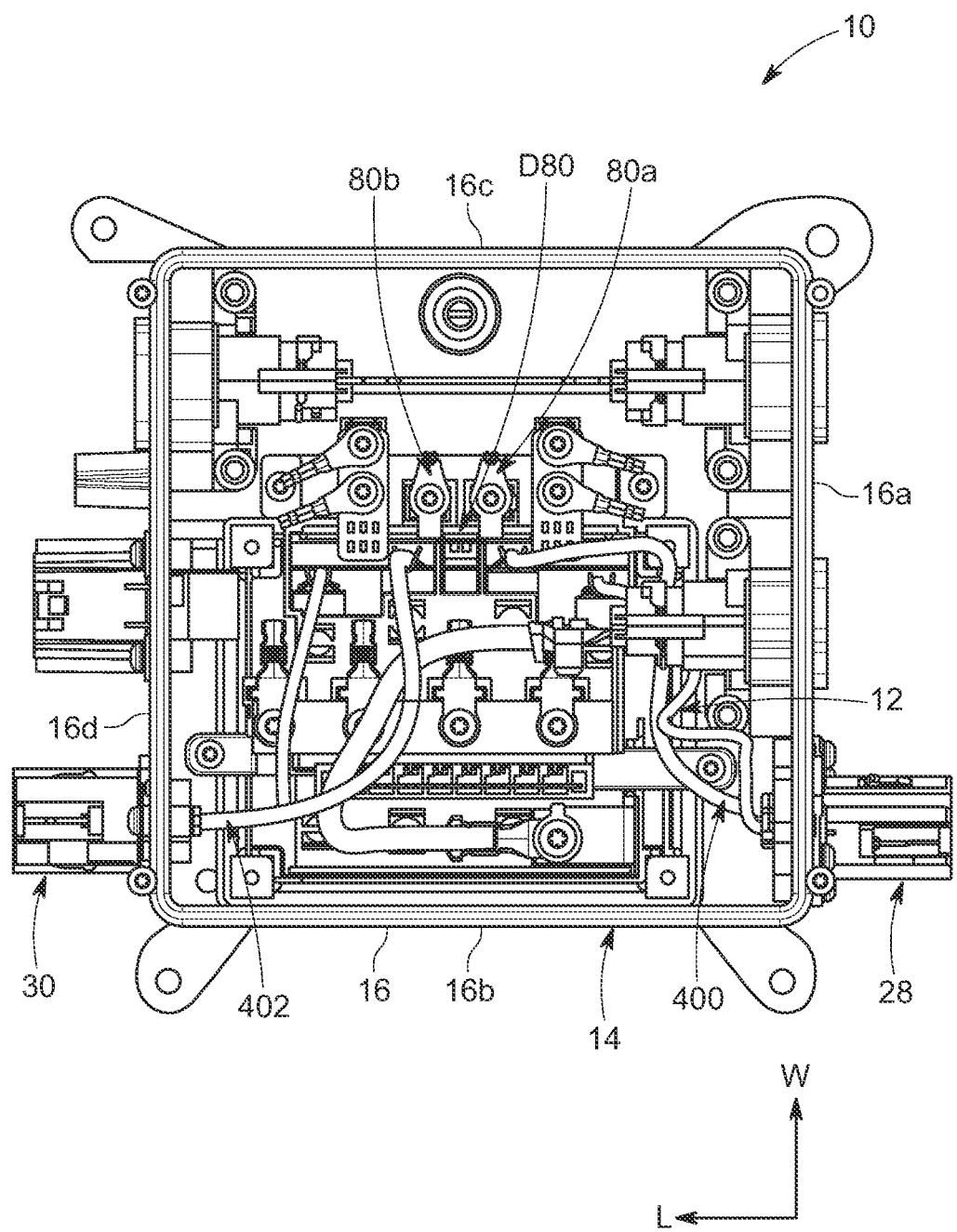
FIG. 4 is a top view of the electric junction box shown in FIG. 1 with the top cover removed.
Figure 5A:
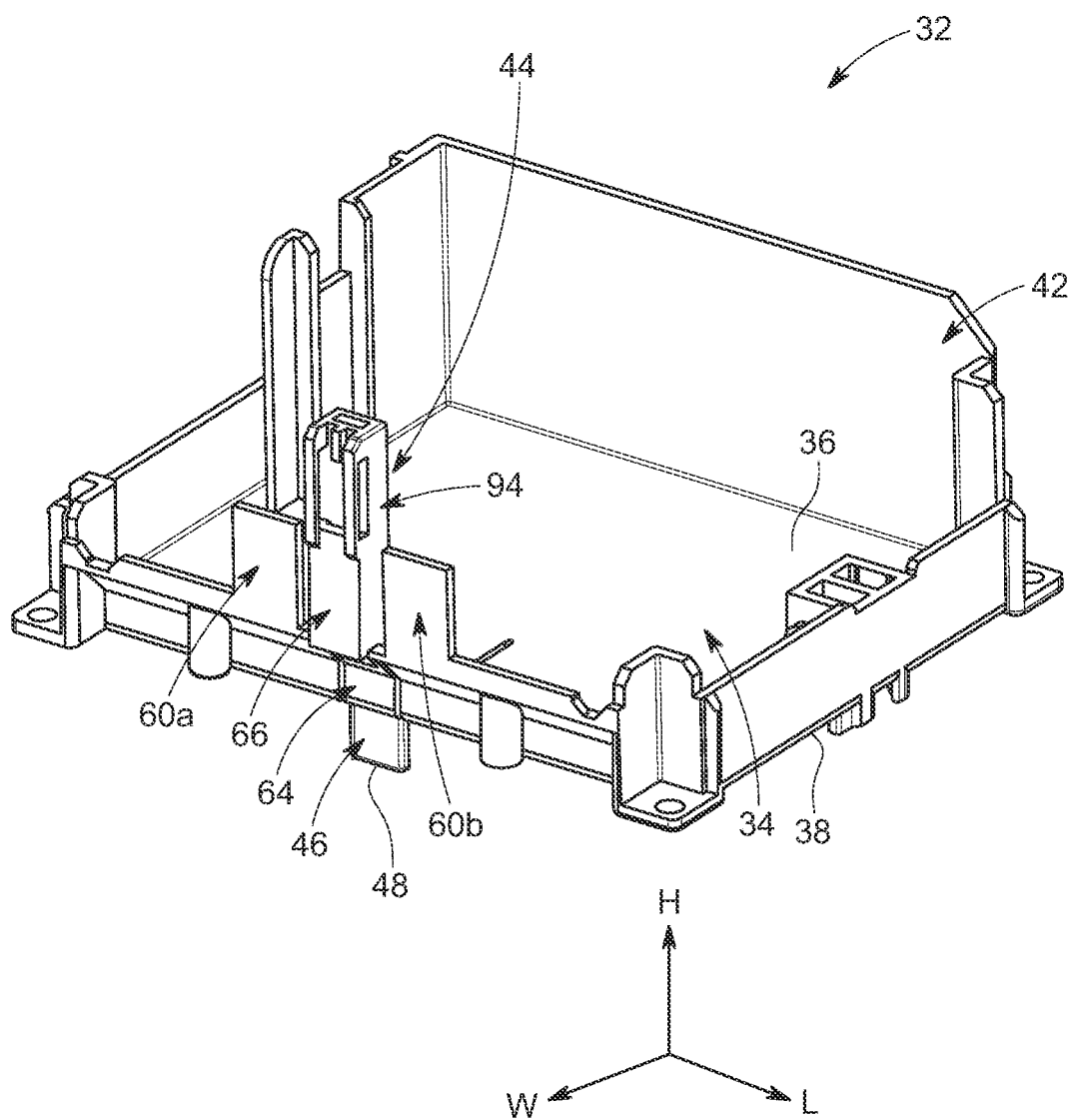
FIG. 5A is a perspective view of the fuse cover assembly shown in FIG. 2.
Figure 5B:
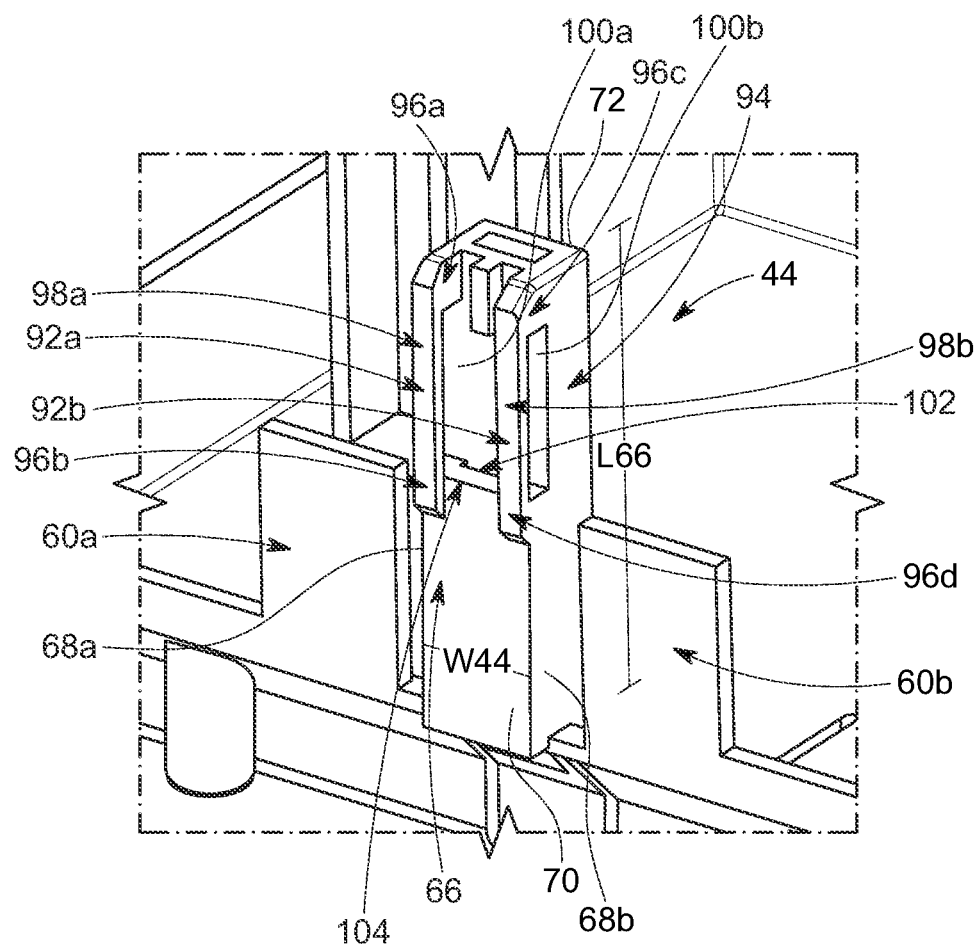
FIG. 5B is a close-up perspective view of the tower shown in FIG. 5A.
Figure 6:
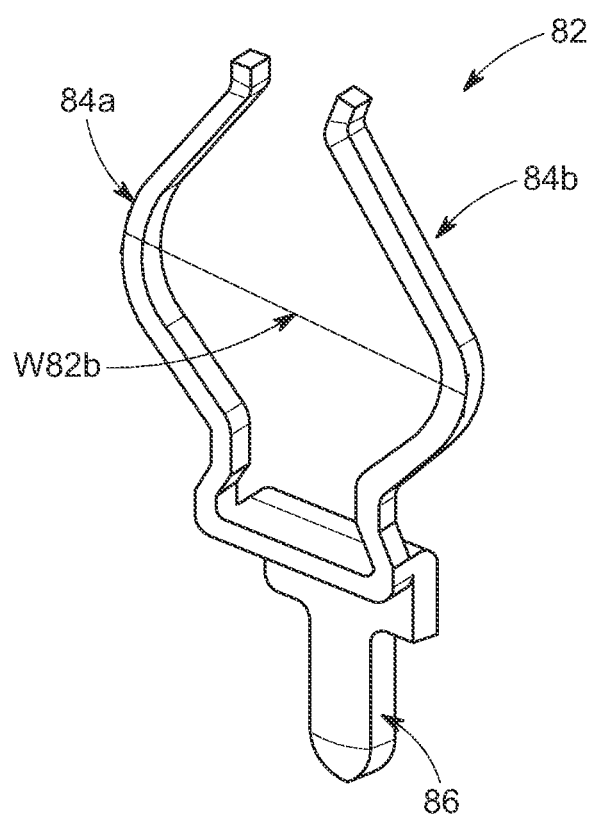
FIG. 6 is a perspective view of the spring shown in FIG. 3.

With reference again to FIG. 3 and now to FIG. 4, the fuse cover assembly 32 is dimensioned to fit entirely within the outer case 14. The fuse cover assembly 32 is closed by the bottom cover 26 and the top cover 24. The bottom surface 38 is configured to contact the bottom cover 26 when the bottom cover 26 is mounted to the open bottom 22 of the outer case 14. The bottom cover 26 is further configured to urge the tower 44 upwardly so as to complete an electric connection. In particular, the electric junction box assembly 10 includes a pair of terminals 80a, 80b disposed in the outer case 14. The terminals 80a, 80b are spaced apart from each other, defining a distance D80 between terminals 80a, 80b, and fixed within the outer case 14. One of the terminals 80a, 80b is connected to the first wire 400 and the other terminal 80a, 80b is connected to the second wire 402. Thus, electrically connecting the pair of terminals 80a, 80b to each other provides power supply from the power source 200 to the electric devices 300.

The fuse cover assembly 32 further includes a spring 82. The spring 82 is made of a resilient and electrically conductive material. The spring 82 is configured to electrically connect the pair of terminals 80a, 80b. In particular, the spring 82 is dimensioned to be positioned between the pair of terminals 80a, 80b and contact both of the terminals 80a, 80b to complete an electric connection. When the spring 82 is removed or displaced from the pair of terminals 80a, 80b, an open circuit is formed and power supply from the power source 200 to the electric devices 300 is disconnected.

The spring 82 is a generally U-shaped member having a pair of spring prongs 84a, 84b extending upwardly from a spring base 86. The spring prongs 84a, 84b are resilient and designed to move inward when in a loaded state, and return outward when in an unloaded state. When the spring 82 is in its unloaded state, not in contact with the terminals 80a, 80b, the distance between the spring prongs 84a, 84b has an unloaded width W82b. This unloaded width W82b of the spring 82 is greater than the width of the tower 44, so as to say when the spring 82 is unloaded, the spring prongs 84a, 84b sit beyond the boundaries of the side walls 16b, 16c. Furthermore, the unloaded width W82b of the spring 82 is greater than the distance D80 between the terminals 80a, 80b. When the spring 82 is in contact with the terminals 80a, 80b, the rigidity of the terminals 80a, 80b force the spring 82 to load and compress, decreasing the width between spring prongs 84a, 84b to a loaded width W82a. The loaded width W82a of the spring 82 is equal to the distance D80 between the terminals 80a, 80b. In this loaded configuration, the spring 82 is completing the electrical connection between the terminals 80a, 80b.

With reference now to FIG. 5A-FIG. 7, the tower 44 is configured to hold the spring 82 in a fixed position, aside from the inward and outward movement of the spring prongs 84a, 84b. In such an aspect, tower 44 includes a pair of retaining fingers 92a, 92b disposed on a top portion 94 of the second portion 66 of the tower 44. Each retaining finger 92a, 92b is spaced apart from the other along a length "L" of the tower 44. Each retaining finger 92a, 92b comprises a pair of ends 96a, 96b, 96c, 96d, and each end 96a, 96b, 96c, 96d of the retaining fingers 92a, 92b are fixed to the outer surface 70 of the top portion 94 of the tower 44. Furthermore, each retaining finger 92a, 92b includes a middle portion 98a, 98b interposed between the respective ends 96a, 96b, 96c, 96d of the corresponding retaining fingers 92a, 92b. The middle portion 98a, 98b is spaced apart from the outer surface 70 of the tower 44 so as to define a finger slit 100a, 100b configured to receive the spring 82. For instance, the retaining fingers 92a, 92b are configured to engage opposing sides of the spring 82 so as to prevent the spring 82 from sliding along the width of the tower 44 or prevent the spring 82 from being disengaged from the tower 44 in general.

The tower 44 may further include a cavity 102 interposed between the pair of retaining fingers 92a, 92b and extending along the length "L" of the tower 44. The cavity 102 is sized to accept the entirety of the spring base 86, and a portion of the spring 82 abuts against a ridge 104 extending between the pair of retaining fingers 92a, 92b. When the spring base 86 is inserted into the cavity 102, the spring prongs 84a, 84b are positioned within the retaining finger slits 100a, 100b, as described above. This configuration maintains the spring base 86 as being pressed flat against the outer surface 70, disposed within the cavity 102, and the spring prongs 84a, 84b as being pressed flat against the middle portion 98a, 98b of the retaining fingers 92a, 92b, contained within the finger slits 100a, 100b.

In operation, with reference again to FIG. 7, when the fuse cover assembly 32 is fully inserted within the outer case 14 and the bottom cover 26 is installed, sealing the open bottom 22 using conventional fastening means, the spring 82 electrically connects the terminals 80a, 80b, completing the circuit and allowing power to flow through the electric junction box assembly 10.

The bottom cover 26 presses against the activation tab 46 of the fuse cover assembly 32, and specifically, the bottom cover 26 presses against the contact portion 48. The contact portion 48 is the only component of the activation tab 46 that contacts the bottom cover 26. When this contact occurs, the force applied from the installed bottom cover 26 forces the living hinge 52 to hinge the tower 44 and the activation tab 46, working together as a unitary piece with the activation tab 46, into its compressed state. In doing so, the tower 44 is disposed between the terminals 80a, 80b when the bottom cover 26 is installed. The tower 44 itself does not interfere with the terminals 80a, 80b when the bottom cover 26 is installed, despite being disposed between the terminals 80a, 80b. This is accomplished by the width of the tower 44 being slightly smaller than the distance D80 between the terminals 80a, 80b. This sizing prevents the tower 44 from interfering with the terminals 80a, 80b, as the tower 44 can fit directly in between the terminals 80a, 80b without making contact.

When the installed bottom cover 26 forces the activation tab 46 and tower 44 into its compressed state, the spring 82 is forced between the terminals 80a, 80b. In doing so, the spring prongs 84a, 84b compress, defining the loaded width W82a of the spring 82. In its loaded state, the spring 82 completes the electric connection between the terminals 80a, 80b, allowing power to flow through the electric junction box assembly 10.

With reference now to FIG. 8, the activation tab 46 and the tower 44 are in an uncompressed state and the spring 82 is in an unloaded state when the bottom cover 26 is not installed to the outer case 14. The uncompressed living hinge 52 is in its resting state when the bottom cover 26 is not installed. When uncompressed, the living hinge 52 forces the arm 50 to be positioned at a downward angle, below the bottom surface 38 of the base 34. Furthermore, the unitary movement of the activation tab 46 and the tower 44, when uncompressed, allow the spring 82 to be positioned below the terminals 80a, 80b. This uncompressed position allows the spring 82 to unload and terminate contact between the terminals 80a, 80b, severing the electric connection between the terminals 80a, 80b and stopping the flow of power through the electric junction box assembly 10. This function is facilitated solely by the removal of the bottom cover 26, the removal of which quickly, conveniently, and safely disconnects power from the electric junction box assembly 10.

When unloaded, the contact portion 48 sits below the plane of the open bottom 22. Because of this position of the contact portion 48, the bottom cover 26 cannot be installed without forcing pressure against the contact portion 48. The force against the contact portion 48 from the installation of the bottom cover 26 allows the activation tab 46 and tower 44 to hingedly move into its loaded state, facilitated by the living hinge 52, and forcing the spring 82 to load and compress between the terminals 80a, 80b, completing the electric connection and once again allowing power to flow through the electric junction box assembly 10.

In another embodiment of the electric junction box assembly 10, the living hinge 52, the slits 58a, 58b, and the arm 50 may be eliminated from the fuse cover assembly 32. In such an aspect, the activation tab 46 and the tower 44 are integrally formed to the base 34. The activation tab 46 is dimensioned to contact the bottom cover 26 when the bottom cover 26 is installed. During installation, the bottom cover 26 presses the activation tab 46 upwardly, wherein the tower 44 is positioned firmly between the terminals 80a, 80b, and the rigidity of the terminals 80a, 80b forces the spring 82 into the loaded state completing the electric circuit. Accordingly, it should be appreciated that in this embodiment, the appearance of the fuse cover assembly 32 and its elements, when fully inserted into the outer case 14 with the bottom cover 26 installed, would be identical to the first embodiment. To disconnect the electric circuit, the bottom cover 26 is removed and the fuse cover assembly 32 is pulled out manually for power to be disconnected from the electric junction box assembly 10.

In the aforementioned optional configuration, it can be appreciated that the act of removing the bottom cover 26 may cause the fuse cover assembly 32 to be displaced by gravity, wherein the fuse cover assembly simply displaces the tower 44 from the terminals 80a, 80b by the sheer weight of the fuse cover assembly 32.

Accordingly, the electric junction box assembly 10 disclosed herein allows power to be disconnected by simply removing the bottom cover 26 so as to allow for maintenance to be performed.

While particular embodiments have been illustrated and described herein, it should be appreciated and understood that various other changes and modifications may be made without departing from the spirit and scope of the claim subject matter. Moreover, although various aspects of the claim subject matter have been described herein, such aspects need not be utilized in combination. It is therefore intended that the appended claims cover all such changes and modifications that are within the scope of the claim subject matter.

The invention claimed is:

1. An electric junction box for supplying power from a battery to an electric device, the electric junction box comprising:
   an outer case having an open bottom opposite of an open top;
   a pair of terminals fixed within the outer case and spaced apart from each other;
   a top cover configured to close the open top;
   a bottom cover configured to close the open bottom; and
   a fuse cover assembly disposed within the outer case, the fuse cover assembly including a base having a top surface and a bottom surface opposite of the top surface, a tower disposed on the top surface and configured to hold a spring, an activation tab disposed on the bottom surface, wherein the bottom cover is configured to engage the activation tab so as to position the spring between the pair of terminals so as to complete an electric connection.

2. The electric junction box as set forth in claim 1, wherein the activation tab is hingedly connected to the fuse cover assembly.

3. The electric junction box as set forth in claim 1, wherein the activation tab includes an arm and a contact portion, the arm orthogonal to the tower and the contact portion.

4. The electric junction box as set forth in claim 1, wherein the arm is integrally formed to the base and is defined by a pair of slits on opposite ends.

5. The electric junction box as set forth in claim 1, wherein the fuse cover assembly further includes a pair of walls spaced apart from each other and a lower portion of the tower is interposed between the pair of walls.

6. The electric junction box as set forth in claim 1, wherein the arm, the contact portion, and the tower are formed as a unitary piece.

7. The electric junction box as set forth in claim 1, wherein the arm moves between a compressed and an uncompressed state, the arm angled downwardly relative to the base in the uncompressed state, the arm flush with the base in the compressed state so as to position the spring between the pair of terminals.

8. The electric junction box as set forth in claim 1, wherein a top portion of the tower is configured to hold the spring in a fixed position.

9. The electric junction box as set forth in claim 8, wherein the spring is formed of an electrically conductive material.

10. The electric junction box as set forth in claim 8, wherein the tower includes a pair of retaining fingers spaced apart from a body of the tower and configured to position the spring between the body and the retaining fingers.

11. The electric junction box as set forth in claim 1, wherein the tower has a width configured to be received between the pair of terminals.

12. The electric junction box as set forth in claim 1, wherein the spring is compressible between a loaded state and an unloaded state, wherein a width of the spring is wider in the unloaded state relative to the loaded state.

13. The electric junction box as set forth in claim 1, wherein in an unloaded state, the width of the spring is greater than a width of the body of the tower.

14. The electric junction box as set forth in claim 1, wherein the pair of terminals generates a load to move the spring to the loaded state.

\* \* \* \* \*